(12) United States Patent
Lei

(10) Patent No.: US 9,686,501 B2
(45) Date of Patent: Jun. 20, 2017

(54) PHOTOGRAPHING PROCESSING METHOD AND SYSTEM BASED ON MOBILE TERMINAL

(71) Applicant: HUIZHOU TCL MOBILE COMMUNICATION CO., LTD, Huizhou, Guangdong (CN)

(72) Inventor: Ming Lei, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 0 days.

(21) Appl. No.: 15/106,546

(22) PCT Filed: Nov. 3, 2015

(86) PCT No.: PCT/CN2015/093659
§ 371 (c)(1),
(2) Date: Jun. 20, 2016

(87) PCT Pub. No.: WO2016/155311
PCT Pub. Date: Oct. 6, 2016

(65) Prior Publication Data
US 2017/0134689 A1 May 11, 2017

(30) Foreign Application Priority Data
Apr. 1, 2015 (CN) .......................... 2015 1 0151437

(51) Int. Cl.
*H04N 5/907* (2006.01)
*G06F 17/30* (2006.01)

(52) U.S. Cl.
CPC ......... *H04N 5/907* (2013.01); *G06F 17/3028* (2013.01)

(58) Field of Classification Search
CPC .......................... H04N 5/907; G06F 17/3028
See application file for complete search history.

(56) References Cited

U.S. PATENT DOCUMENTS

| | | | |
|---|---|---|---|
| 2006/0088284 A1* | 4/2006 | Shen .................. | H04N 1/00132 386/231 |
| 2011/0034176 A1* | 2/2011 | Lord ................. | G06F 17/30244 455/450 |
| 2016/0073059 A1* | 3/2016 | Bader-Natal ............. | H04N 7/15 348/14.03 |

FOREIGN PATENT DOCUMENTS

| | | |
|---|---|---|
| CN | 102185959 A | 9/2011 |
| CN | 102984390 A | 3/2013 |
| CN | 104794173 A | 7/2015 |
| KR | 20070056522 A | 6/2007 |

* cited by examiner

*Primary Examiner* — Tuan Ho
(74) *Attorney, Agent, or Firm* — Ladas & Parry LLP

(57) ABSTRACT

A photographing processing method based on a mobile terminal comprises the steps of: providing an option on the mobile terminal for setting a picture classification beforehand and providing an option for adding a classification label; receiving, by using the option for setting the picture classification, an operational instruction from a user in a photographing interface for selecting a certain classification as a currently photographing classification; and automatically appending, when a certain classification is selected as the currently photographing classification, corresponding picture information to a photographed picture after photographing the picture, and saving the photographed picture in a corresponding directory.

13 Claims, 7 Drawing Sheets

| Classification 1 | Icon |
|---|---|
| Classification 2 | Icon |
| ... | Icon |
| Classification n | Icon |
| Adding | |

FIG. 2

PHOTOGRAPHING PROCESSING METHOD AND SYSTEM BASED ON MOBILE TERMINAL

CROSS REFERENCE TO RELATED APPLICATION

This application claims the priority of International Application No. PCT/CN2015/093659, filed on Nov. 3, 2015, which claims priority to Chinese Application No. 201510151437.X, filed on Apr. 1, 2015. The entire disclosures of each of the above applications are incorporated herein by reference.

TECHNICAL FIELD OF THE INVENTION

The present invention relates to a mobile terminal technology, and more particularly, to a photographing processing method and system based on a mobile terminal.

BACKGROUND OF THE INVENTION

As with the development of mobile communication and the improvement of living standards, various mobile terminals such as cell phones are used more and more widely. A cell phone has become an indispensable communication tool in human life.

In the existing skills, the cell phones possess more and more functions, and, basically, each of them is equipped with a camera having an ability to take a picture. Various topics are covered in photography. They are not limited to portrait and landscape. The photographs may even serve as notes. For example, each time a car is refueled, the meter of a fuel dispenser and the car odometer can be photographed such that it is convenient to estimate fuel use in the future. Furthermore, a water meter, a gas meter, and an electricity meter can be photographed each month such that it is convenient to check the use of water, gas, and electricity in the later day. However, the existing cell phones save the files obtained by photographing into the same location. If the number of photographed pictures is increased after a certain period of time, it is difficult to find the desired pictures and it is inconvenient to delete unwanted figures in a batch process.

Therefore, there is a need to further develop and improve the existing skills.

SUMMARY OF THE INVENTION

The technical problems to be solved in the present invention are that for the above drawbacks in the existing skills, the present invention provides a photographing processing method and system based on a mobile terminal. In the present invention, a user can save photographed pictures to a corresponding classification in a short time. It is convenient for the user to find the desired pictures and deal with subsequent stuff. The present invention improves the efficiency in looking for a picture and provides a convenient way for the user to delete unwanted pictures in a batch process, providing convenience for the user.

To solve above technical problems, the technical schemes provided by the present invention are described below.

A photographing processing method based on a mobile terminal, comprising the steps of: providing an option on the mobile terminal for setting a picture classification beforehand and providing an option for adding a classification label; receiving, by using the option for setting the picture classification, an operational instruction from a user in a photographing interface for selecting a certain classification as a currently photographing classification; adding and setting a new picture classification by using the option for adding the classification label and providing a menu option for selecting a one-time effect or a long-term effect in selecting the classification; and automatically appending, when a certain classification is selected as the currently photographing classification, corresponding picture information to a photographed picture after photographing the picture, and saving the photographed picture in a corresponding directory.

After the step of automatically appending, when a certain classification is selected as the currently photographing classification, the corresponding picture information to the photographed picture after photographing the picture, and saving the photographed picture in the corresponding directory, the photographing processing method based on the mobile terminal further comprises a step of: providing a classification-based viewing option in browsing the pictures, and browsing the pictures or figures of a certain classification by using the classification-based viewing option.

The photographing processing method based on the mobile terminal further comprises a step of: setting, in the photographing interface by using the option for setting the picture classification by receiving the operational instruction from the user, a topic, note information, and a desired directory to preserve the picture, of a present classification for each classification label.

After a certain classification is selected as the currently photographing classification, the photographing processing method based on the mobile terminal further comprises a step of: automatically adding a corresponding topic and note information to a corresponding database for the photographed picture and automatically saving the picture in the corresponding directory specified in advance after photographing the picture.

After a certain classification is selected as the currently photographing classification, the photographing processing method based on the mobile terminal further comprises the steps of: determining whether a value is assigned to a classification preserving path variable in preserving the picture after photographing is accomplished, and preserving the picture according to such a path if a value is assigned and preserving the picture using a system default path if no value is assigned; and writing note information to a database corresponding to the picture if a value is assigned to a classification note information preservation variable.

A photographing processing method based on a mobile terminal, comprising the steps of: providing an option on the mobile terminal for setting a picture classification beforehand and providing an option for adding a classification label; receiving, by using the option for setting the picture classification, an operational instruction from a user in a photographing interface for selecting a certain classification as a currently photographing classification; and automatically appending, when a certain classification is selected as the currently photographing classification, corresponding picture information to a photographed picture after photographing the picture, and saving the photographed picture in a corresponding directory.

After the step of automatically appending, when a certain classification is selected as the currently photographing classification, the corresponding picture information to the photographed picture after photographing the picture, and saving the photographed picture in the corresponding directory, the photographing processing method based on the mobile terminal further comprises a step of: providing a classification-based viewing option in browsing the pictures, and browsing the pictures or figures of a certain classification by using the classification-based viewing option.

The photographing processing method based on the mobile terminal comprises a step of: adding and setting a new picture classification in the photographing interface by using the option for adding the classification label.

The photographing processing method based on the mobile terminal comprises a step of: providing a menu option in the photographing interface for selecting a one-time effect or a long-term effect in selecting the classification.

The photographing processing method based on the mobile terminal further comprises a step of: setting, in the photographing interface by using the option for setting the picture classification by receiving the operational instruction from the user, a topic, note information, and a desired directory to preserve the picture, of a present classification for each classification label.

After a certain classification is selected as the currently photographing classification, the photographing processing method based on the mobile terminal further comprises a step of: automatically adding a corresponding topic and note information to a corresponding database for the photographed picture and automatically saving the picture in the corresponding directory specified in advance after photographing the picture.

After a certain classification is selected as the currently photographing classification, the photographing processing method based on the mobile terminal further comprises the steps of: determining whether a value is assigned to a classification preserving path variable in preserving the picture after photographing is accomplished, and preserving the picture according to such a path if a value is assigned and preserving the picture using a system default path if no value is assigned; and writing note information to a database corresponding to the picture if a value is assigned to a classification note information preservation variable.

A photographing processing system based on a mobile terminal, comprising: an option providing module for providing an option on the mobile terminal for setting a picture classification beforehand and providing an option for adding a classification label; a classification selecting module for receiving, by using the option for setting the picture classification, an operational instruction from a user in a photographing interface for selecting a certain classification as a currently photographing classification; a preserving controlling module for automatically appending, when a certain classification is selected as the currently photographing classification, corresponding picture information to a photographed picture after photographing the picture, and saving the photographed picture in a corresponding directory; and a browsing controlling module for providing a classification-based viewing option in browsing the pictures, and browsing the pictures or figures of a certain classification by using the classification-based viewing option.

In the photographing processing system based on the mobile terminal, the classification selecting module comprises: a classification selecting unit for receiving the operational instruction from the user for selecting a certain classification as a currently photographing classification; a new classification setting unit for adding and setting a new picture classification by using the option for adding the classification label; an option providing unit for providing a menu option for selecting a one-time effect or a long-term effect in selecting the classification; and a receiving unit for setting, by using the option for setting the picture classification by receiving the operational instruction from the user, a topic, note information, and a desired directory to preserve the picture, of a present classification for each classification label.

In the photographing processing system based on the mobile terminal, the preserving controlling module comprises: a photographing preserving controlling unit for automatically adding a corresponding topic and note information to a corresponding database for the photographed picture and automatically saving the picture in the corresponding directory specified in advance after photographing the picture; and a preserving path controlling unit for determining whether a value is assigned to a classification preserving path variable in preserving the picture after photographing is accomplished, and preserving the picture according to such a path if a value is assigned and preserving the picture using a system default path if no value is assigned; and writing note information to a database corresponding to the picture if a value is assigned to a classification note information preservation variable.

In the photographing processing method and system based on the mobile terminal in accordance with the present invention, a new function is added to the mobile terminal. It is convenient for the user to find the desired pictures and deal with subsequent stuff. The present invention improves the efficiency in looking for a picture and provides a convenient way for the user to delete unwanted pictures in a batch process, providing convenience for the user.

BRIEF DESCRIPTION OF THE DRAWINGS

For explaining the technical schemes used in the conventional skills and the embodiments of the present invention more clearly, the drawings to be used in the embodiments or the descriptions on the conventional skills will be briefly introduced in the following. Obviously, the drawings below are only some embodiments of the present invention, and those of ordinary skill in the art can further obtain other drawings according to these drawings without making any inventive effort.

FIG. 2 is a schematic diagram showing a classification option structure in the the photographing processing method based on the mobile terminal in accordance with a preferred embodiment of the present invention.

DETAILED DESCRIPTION OF THE INVENTION

To make the objectives, technical schemes, and advantages of the present invention more clear and specific, the present invention is described in further detail below with reference to the embodiments in accompanying with the appending drawings. It should be understood that the specific embodiments described herein are merely for explaining the present invention and the present invention is not limited thereto.

Figure 1:
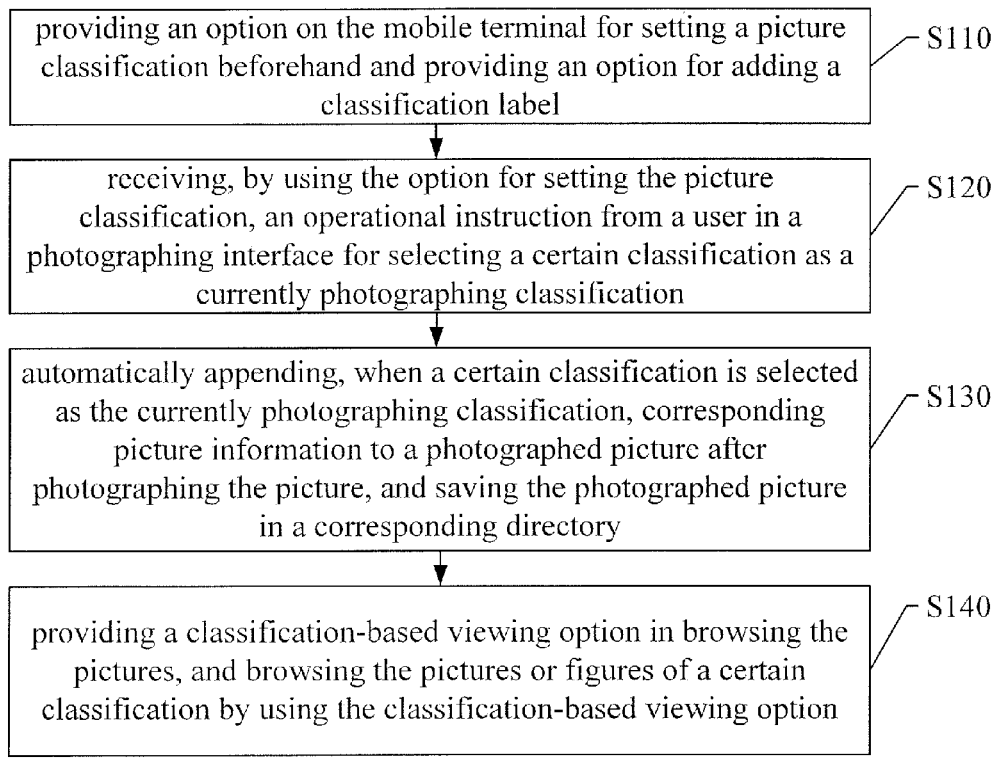
FIG. 1 is a flow chart of a photographing processing method based on a mobile terminal in accordance with a preferred embodiment of the present invention.

Please refer to FIG. 1, which is a flow chart of a photographing processing method based on a mobile terminal in accordance with a preferred embodiment of the present invention. As illustrated in FIG. 1, the photographing processing method based on the mobile terminal comprises:

Step S110—providing an option on the mobile terminal for setting a picture classification beforehand and providing an option for adding a classification label.

In the embodiments of the present invention, it is required to provide an option on the mobile terminal for setting a picture classification beforehand, that is, provide a menu option for setting a classification of a picture or a figure. For example, an option corresponding to a classification selection function is added to the settings of a camera program in the mobile terminal. By using such an option, a user may open a classification selection interface including Classification 1 (e.g., portrait) and (selection of a corresponding) icon, Classification 2 (e.g., landscape) and a corresponding icon, . . . Classification N and a corresponding icon, and so on, as illustrated in FIG. 2.

As illustrated in FIG. 2, the embodiments of the present invention further provide an option for adding a classification label. That is, by using this interface, a user may select a classification already created as well as may add a classification by using the "Adding" option.

Figure 3:
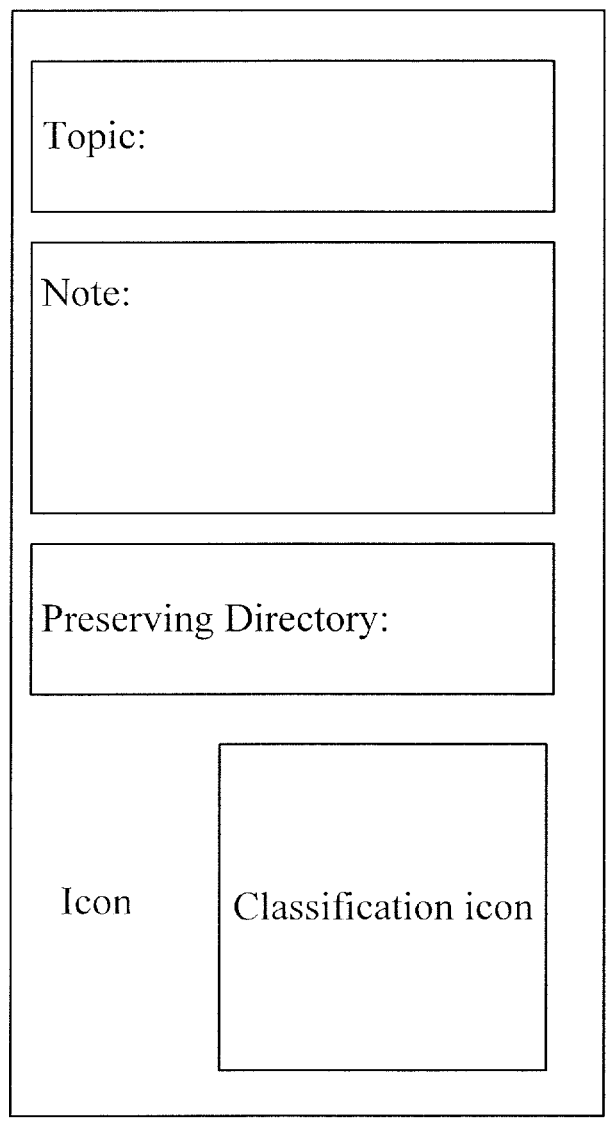
FIG. 3 is a schematic diagram showing a classification adding interface in the the photographing processing method based on the mobile terminal in accordance with a preferred embodiment of the present invention.

As illustrated in FIG. 3, a classification adding interface may include functions for adding a topic (with information), a note (with information), a preserving directory (with information), an icon for a classification icon. As can be seen from FIG. 3, the user may input a topic and note information for a classification, and an address preserving the classification. A figure may also be added so as to be more intuitive in selecting the classification in the future.

Step S120 receiving, by using the option for setting the picture classification, an operational instruction from a user in a photographing interface for selecting a certain classification as a currently photographing classification.

In the embodiments of the present invention, when it is required to set and save the photographed picture to a corresponding classification, a currently photographing classification may be selected by using the option for setting the picture classification by receiving an operational instruction from a user in a photographing interface. For example, a portrait classification or a landscape classification may be selected when traveling. A note classification may be selected when one takes a note.

In implementation, if there is no corresponding classification among the classification options shown in FIG. 2, a new picture classification may of course be added and set by using the option for adding the classification label. After launching the setting interface shown in FIG. 3, a user may fill the required information on the interface. The user may select a figure or a picture by pointing at the classification icon, as illustrated in FIG. 3.

After the user fills out the information, the user may be prompted whether to save the information when exiting the classification adding interface. If the user chooses to save the information, the set classification will be preserved.

For each of the classification labels, by using the option for setting the picture classification by receiving an operational instruction from a user, a topic, note information, and a desired directory to preserve the picture, of a present classification can be set.

Step S130—automatically appending, when a certain classification is selected as the currently photographing classification, corresponding picture information to a photographed picture after photographing the picture, and saving the photographed picture in a corresponding directory.

In the embodiments of the present invention, after a certain classification is selected by the user, related note information will be added to a database for all the pictures taken by the user and the pictures will be saved in a specified directory. When the user browses on the camera the pictures photographed recently, only the pictures belonging to the present classification will be shown.

That is, in the embodiments of the present invention, a corresponding topic and note information will be automatically added to a corresponding database for the photographed picture and the picture will be automatically saved in a corresponding directory specified in advance after photographing the picture.

In preserving the picture after photographing is accomplished, whether a value is assigned to a classification preserving path variable is determined. If a value is assigned, the picture is preserved according to such a path; if no value is assigned, the picture is preserved using a system default path.

Meanwhile, if a value is assigned to a classification note information preservation variable, the note information will be written to a database corresponding to the picture.

In a further embodiment, as shown in FIG. 1, the photographing processing method based on the mobile terminal may comprise Step S140 after Step S130.

Step S140 providing a classification-based viewing option in browsing the pictures, and browsing the pictures or figures of a certain classification by using the classification-based viewing option.

In the embodiment of the present invention, in browsing the pictures, a user may browse the pictures or figures of a certain classification by using the classification-based viewing option.

Figure 4:
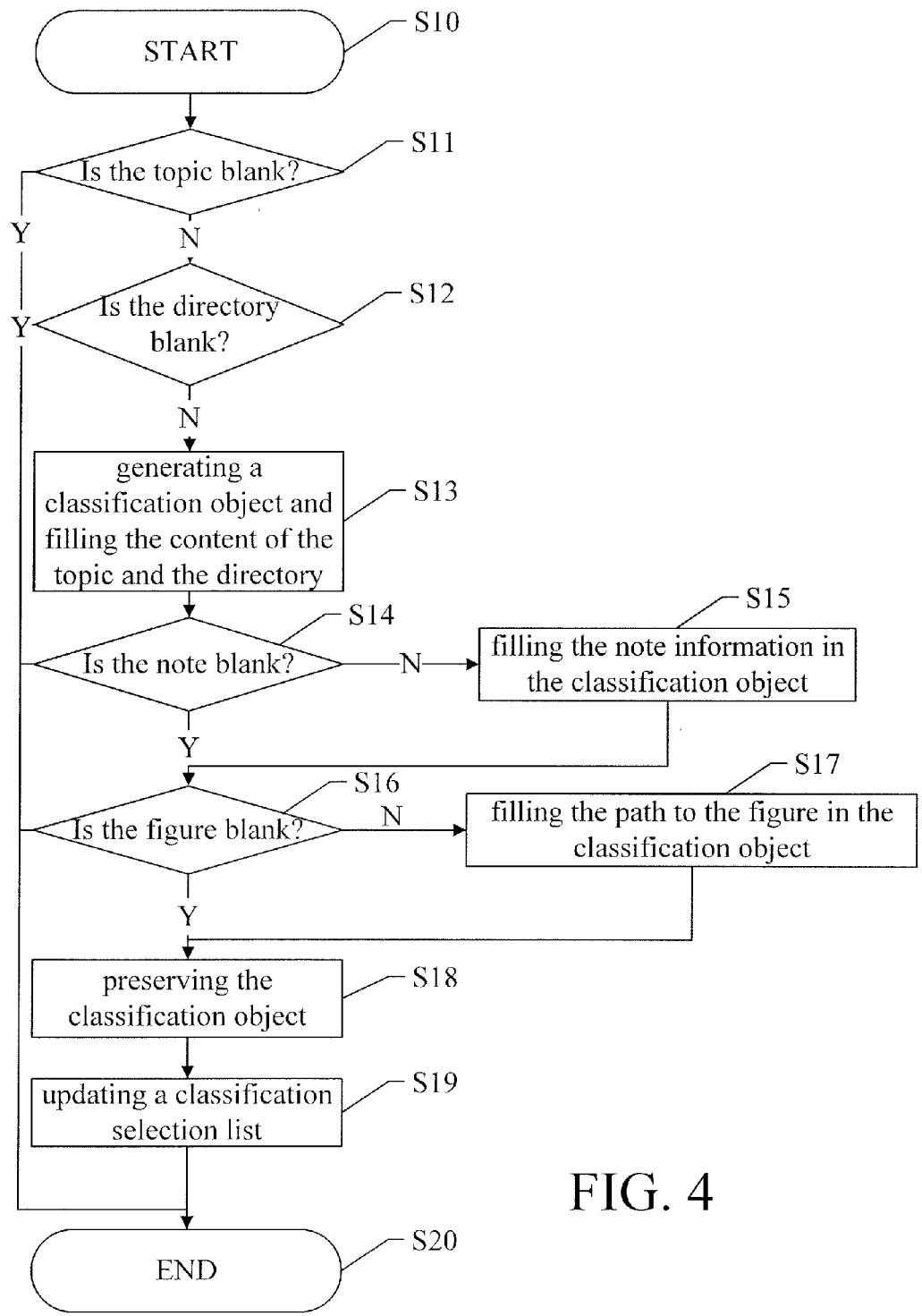
FIG. 4 is a flow chart of setting (adding) a classification and preserving the classification in the photographing processing method based on the mobile terminal in accordance with a preferred embodiment of the present invention.

In implementation, setting (adding) a classification and preserving the classification in the present invention as illustrated in FIG. 4 with reference to FIG. 3 may comprise the following steps.

S10—starting to set (add) a classification. Go to Step S11.

S11—determining whether the topic is blank. Go to Step S12 if no; go to Step S20 if yes.

S12—determining whether the directory is blank. Go to Step S13 if no; go to Step S20 if yes.

S13—generating a classification object and filling the content of the topic and the directory (with reference to FIG. 3). After that, go to Step S14.

S14—determining whether the note information is blank. Go to Step S15 if no; go to Step S16 if yes.

S15—filling the note information in the classification object. Go to Step S16.

S16—determining whether the figure is blank. Go to Step S17 if no; go to Step S18 if yes.

S17—filling the path to the figure in the classification object. Go to Step S18.

S18—preserving the classification object. After that, go to Step S19.

S19—updating a classification selection list. After that, go to Step S20.

S20—end.

As can be seen from FIG. 4, the topic and the preserving directory of a classification cannot be left blank. The user has to fill these information (with reference to FIG. 3). The note information and the figure are optional and the user does not have to fill that.

In the preserving step, an object is generated beforehand. After related information is filled out, the preserving step is proceeded. The types used in the preserving step may be different from different systems. If the preserving step is proceeded in Android System, it may be preserved as "shared preferences" and it may also be preserved as a database. The present invention is not limited thereto.

After the information is saved in the database, a classification selection list is updated such that the user can select from the list in the later day.

Figure 5:
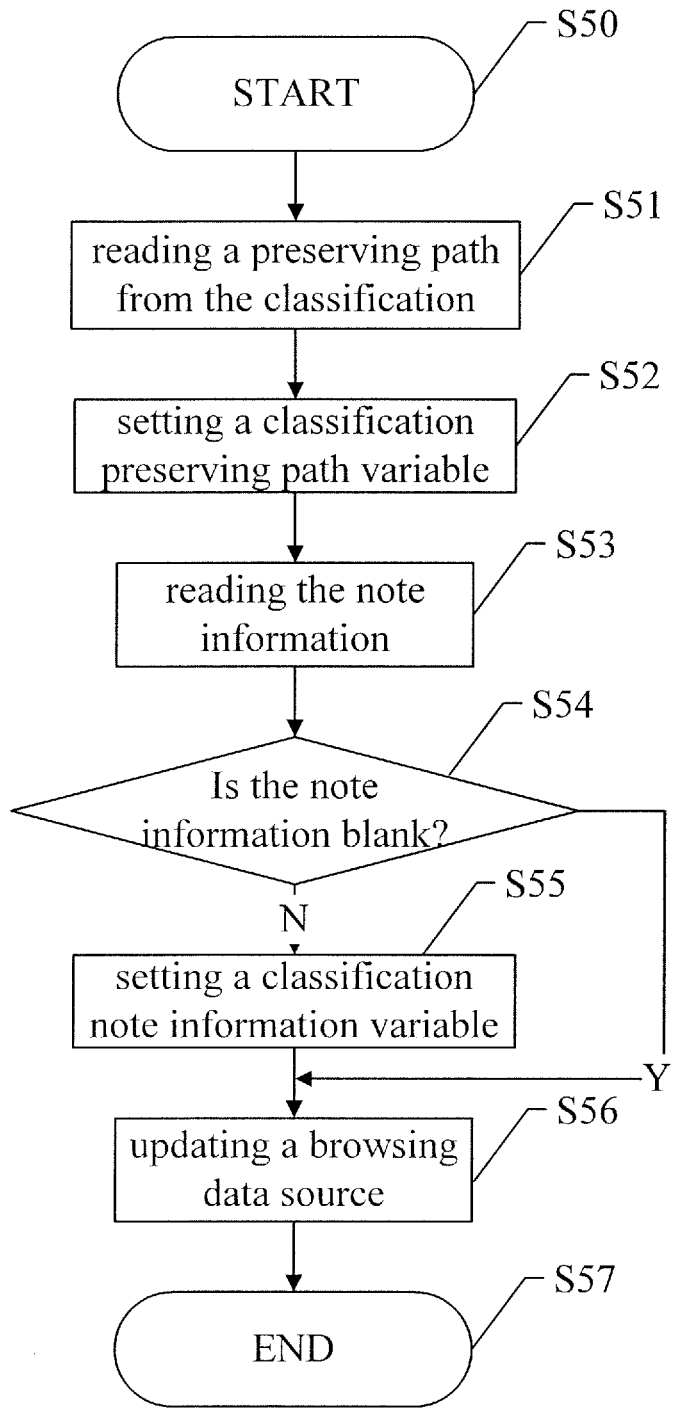
FIG. 5 is a flow chart of selecting a classification in the photographing processing method based on the mobile terminal in accordance with a preferred embodiment of the present invention.

Preferably, in implementation of selecting a classification option in accordance with the present invention, after a user selects one of the classifications in a selection interface shown in FIG. 2, the program performs a resetting procedure to the camera application program based on the selected classification. This process is illustrated in FIG. 5 and may comprise the following steps.

S50—starting to select. Go to Step S51.

S51—reading a preserving path from the classification. Go to Step S52.

S52—setting a classification preserving path variable. Go to Step S53.

S53—reading the note information. Go to Step S54.

S54—determining whether the note information is blank. Go to Step S55 if no; go to Step S56 if yes.

S55—setting a classification note information variable.

S56—updating a browsing data source. Go to Step S57.

S57—end.

As can be seen from FIG. 5, in the embodiments of the present invention, the work to be done is much simpler after a classification is selected. It is only required to set a classification preserving path to a variable in the program. If note information exists, it may just use a variable to preserve the note information as well.

Finally, it is further required to update the data source for browsing the pictures photographed recently.

Preferably, in the implementation, in preserving the picture after photographing is accomplished, the present invention may determine whether a value is assigned to a classification preserving path variable. If a value is assigned, the picture is preserved according to such a path; if no value is assigned, the picture is preserved using a system default path.

Meanwhile, if a value is assigned to a classification note information preservation variable, the note information will be written to a database corresponding to the picture.

Figure 6:
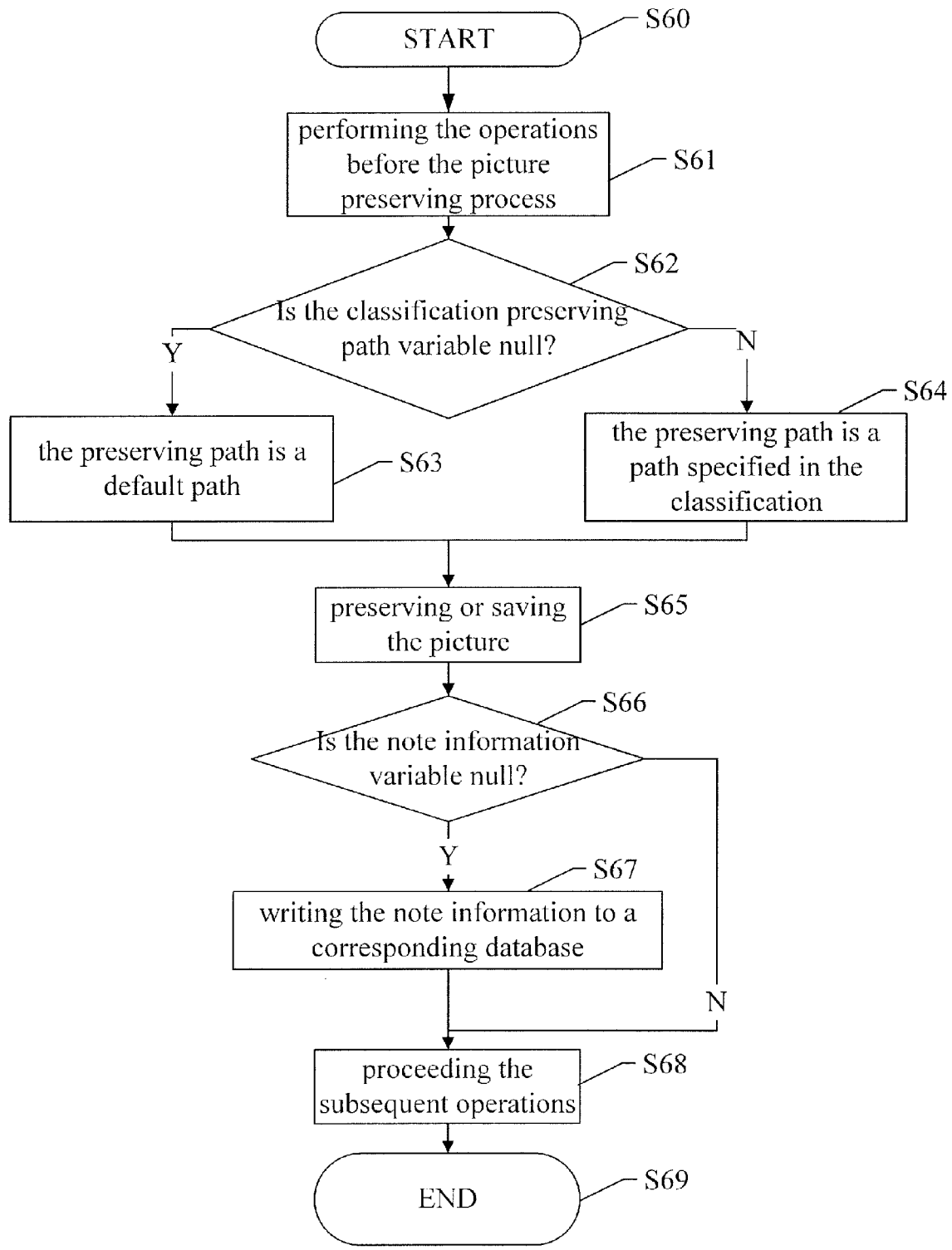
FIG. 6 is a flow chart of preserving a picture in the photographing processing method based on the mobile terminal in accordance with a preferred embodiment of the present invention.
Figure 7:
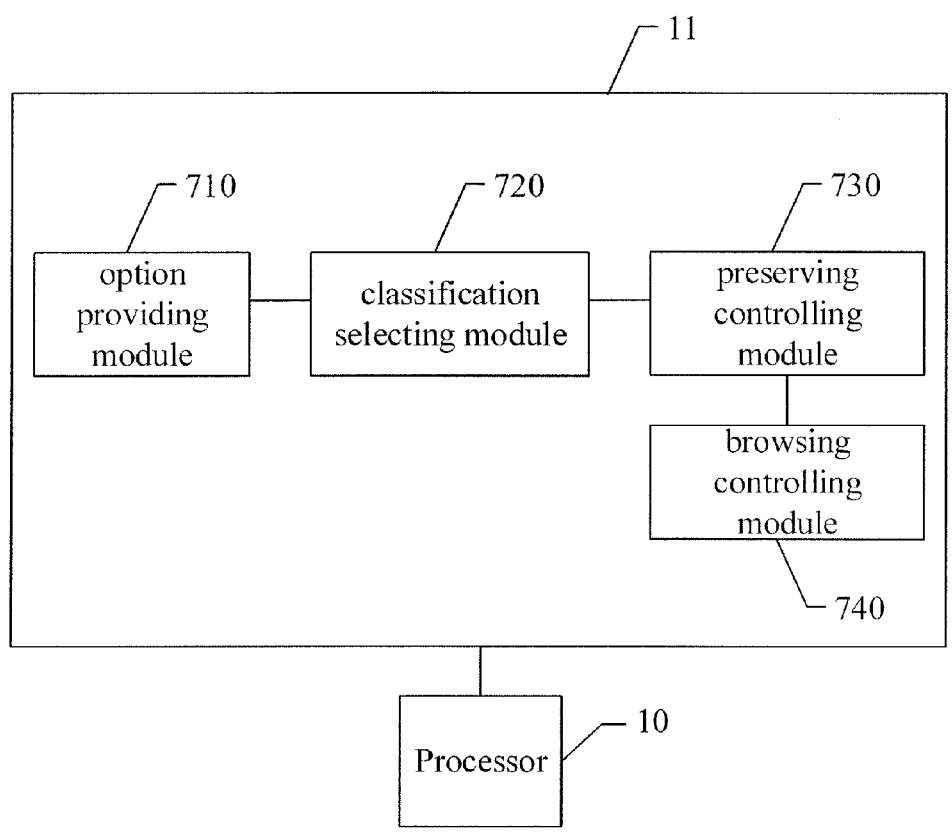
FIG. 7 is a functional block of a photographing processing system based on a mobile terminal in accordance with the present invention.

The related process is illustrated in FIG. 6 and may comprise the following steps.

S60—starting to photograph. Go to Step S61.

S61—performing those operations before the picture preserving process. Go to Step S62.

S62—determining whether the classification preserving path variable is null. Go to Step S63 if yes; go to Step S64 if no.

S63—the preserving path is a default path. Go to Step S65.

S64—the preserving path is a path specified in the classification. Go to Step S65.

S65—preserving or saving the picture.

S66—determining whether the note information variable is null. Go to Step S67 if yes; go to Step S68 if no.

S67—writing the note information to a corresponding database. Go to Step S68.

S68—proceeding the subsequent operations. Go to Step S69.

S69—end.

After the picture preserving process is accomplished, the embodiment of present invention will update (e.g., Android System), in preserving the classification, the browsing data source. The present invention updates an adapter for providing picture data for picture browsing. The process reinitializes the picture data. As to reinitializing the picture data, the present invention utilizes to only read the pictures in the set classification preserving directory such that only the pictures of the present classification will be viewed in browsing pictures.

In viewing detail information of a picture, the note information originally recorded may be read from the database corresponding to the picture and shown in the detail information.

In a further embodiment, in selecting the classification, the photographing processing method based on the mobile terminal in accordance with the present invention may provide a menu option for selecting a one-time effect or a long-term effect. This allows the selected classification to take effects forever or take effects for only one time. In the case of the long-term effect, after a classification is selected, the selection is preserved in the "shared preferences" or the database. In the future, the operations described in the flowchart of FIG. 5 will be executed every time the program launches. In the case of the one-time effect, it is not necessary to perform the operations every time the program launches.

As can be seen, in the photographing processing method based on the mobile terminal in accordance with the present invention, a user can save photographed pictures to a corresponding classification in a short time. It is convenient for the user to find the desired pictures and deal with subsequent stuff. The present invention improves the efficiency in looking for a picture and provides a convenient way for the user to delete unwanted pictures in a batch process, providing convenience for the user.

On a basis of above embodiments, as shown in the drawings, the present invention further provides a photographing processing system based on a mobile terminal, which may comprise: a memory 11 and a processor 10. The memory 11 is used for storing instructions. The processor 10 is coupled to the memory 11, and is used to execute the instructions stored inside the memory 11. All of the modules 710, 720, 730, and 740, and units as introduced below, are instructions executable by the processor 10 to perform corresponding functions. The system comprises following components.

An option providing module 710 for providing an option on the mobile terminal for setting a picture classification beforehand and providing an option for adding a classification label. The details may be referred to the afore-described Step S110.

A classification selecting module 720 for receiving, by using the option for setting the picture classification, an operational instruction from a user in a photographing interface for selecting a certain classification as a currently photographing classification. The details may be referred to the afore-described Step S120.

A preserving controlling module 730 for automatically appending, when a certain classification is selected as the currently photographing classification, corresponding picture information to a photographed picture after photographing the picture, and saving the photographed picture in a corresponding directory. The details may be referred to the afore-described Step S130.

A browsing controlling module 740 for providing a classification-based viewing option in browsing the pictures, and browsing the pictures or figures of a certain classification by using the classification-based viewing option. The details may be referred to the afore-described Step S140.

Further, the classification selecting module of the photographing processing system based on the mobile terminal may comprise:

A classification selecting unit for receiving the operational instruction from the user for selecting a certain classification as a currently photographing classification, as described above.

A new classification setting unit for adding and setting a new picture classification by using the option for adding the classification label, as described above.

An option providing unit for providing a menu option for selecting a one-time effect or a long-term effect in selecting the classification, as described above.

A receiving unit for setting, by using the option for setting the picture classification by receiving the operational instruction from the user, a topic, note information, and a desired directory to preserve the picture, of a present classification for each classification label, as described above.

Further, the preserving controlling module of the photographing processing system based on the mobile terminal may comprise:

A photographing preserving controlling unit for automatically adding a corresponding topic and note information to a corresponding database for the photographed picture and automatically saving the picture in the corresponding directory specified in advance after photographing the picture, as described above.

A preserving path controlling unit for determining whether a value is assigned to a classification preserving path variable in preserving the picture after photographing is accomplished, and preserving the picture according to such a path if a value is assigned and preserving the picture using a system default path if no value is assigned; and writing note information to a database corresponding to the picture if a value is assigned to a classification note information preservation variable, as described above.

Above all, in the photographing processing method and system based on the mobile terminal in accordance with the present invention, a new function is added to the mobile terminal. It is convenient for the user to find the desired pictures and deal with subsequent stuff. The present invention improves the efficiency in looking for a picture and provides a convenient way for the user to delete unwanted pictures in a batch process, providing convenience for the user.

It should be understood that the application of the present invention is not limited to the above-described examples. Those of ordinary skill in the art may make modifications or variations according to the above descriptions, but all such modifications and variations should be within the appended claims.

What is claimed is:

1. A photographing processing method based on a mobile terminal, comprising the steps of:
   providing an option on the mobile terminal for setting a picture classification beforehand and providing an option for adding a classification label;
   receiving, by using the option for setting the picture classification, an operational instruction from a user in a photographing interface for selecting a certain classification as a currently photographing classification;
   adding and setting a new picture classification by using the option for adding the classification label and providing a menu option for selecting a one-time effect or a long-term effect in selecting the classification; and
   automatically appending, when a certain classification is selected as the currently photographing classification, corresponding picture information to a photographed picture after photographing the picture, and saving the photographed picture in a corresponding directory;
   wherein after the step of automatically appending, when a certain classification is selected as the currently photographing classification, the corresponding picture information to the photographed picture after photographing the picture, and saving the photographed picture in the corresponding directory, the method further comprises a step of:
   providing a classification-based viewing option in browsing the pictures, and browsing the pictures or figures of a certain classification by using the classification-based viewing option.

2. The method according to claim 1, further comprising a step of:
   setting, in the photographing interface by using the option for setting the picture classification by receiving the operational instruction from the user, a topic, note information, and a desired directory to preserve the picture, of a present classification for each classification label.

3. The method according to claim 1, wherein after a certain classification is selected as the currently photographing classification, the method further comprises a step of:
   automatically adding a corresponding topic and note information to a corresponding database for the photographed picture and automatically saving the picture in the corresponding directory specified in advance after photographing the picture.

4. The method according to claim 1, wherein after a certain classification is selected as the currently photographing classification, the method further comprises the steps of:
   determining whether a value is assigned to a classification preserving path variable in preserving the picture after photographing is accomplished, and preserving the picture according to such a path if a value is assigned and preserving the picture using a system default path if no value is assigned; and
   writing note information to a database corresponding to the picture if a value is assigned to a classification note information preservation variable.

5. A photographing processing method based on a mobile terminal, comprising the steps of:
   providing an option on the mobile terminal for setting a picture classification beforehand and providing an option for adding a classification label;

receiving, by using the option for setting the picture classification, an operational instruction from a user in a photographing interface for selecting a certain classification as a currently photographing classification; and automatically appending, when a certain classification is selected as the currently photographing classification, corresponding picture information to a photographed picture after photographing the picture, and saving the photographed picture in a corresponding directory;

wherein after the step of automatically appending, when a certain classification is selected as the currently photographing classification, the corresponding picture information to the photographed picture after photographing the picture, and saving the photographed picture in the corresponding directory, the method further comprises a step of:

providing a classification-based viewing option in browsing the pictures, and browsing the pictures or figures of a certain classification by using the classification-based viewing option.

6. The method according to claim 5, further comprising a step of:

adding and setting a new picture classification in the photographing interface by using the option for adding the classification label.

7. The method according to claim 5, further comprising a step of:

providing a menu option in the photographing interface for selecting a one-time effect or a long-term effect in selecting the classification.

8. The method according to claim 5, further comprising a step of:

setting, in the photographing interface by using the option for setting the picture classification by receiving the operational instruction from the user, a topic, note information, and a desired directory to preserve the picture, of a present classification for each classification label.

9. The method according to claim 5, wherein after a certain classification is selected as the currently photographing classification, the method further comprises a step of:

automatically adding a corresponding topic and note information to a corresponding database for the photographed picture and automatically saving the picture in the corresponding directory specified in advance after photographing the picture.

10. The method according to claim 5, wherein after a certain classification is selected as the currently photographing classification, the method further comprises the steps of:

determining whether a value is assigned to a classification preserving path variable in preserving the picture after photographing is accomplished, and preserving the picture according to such a path if a value is assigned and preserving the picture using a system default path if no value is assigned; and writing note information to a database corresponding to the picture if a value is assigned to a classification note information preservation variable.

11. A photographing processing system based on a mobile terminal, comprising:

a processor;

a memory connected with processor, the memory comprising a plurality of program instructions executable by the processor, the plurality of program instructions comprising:

an option providing module for providing an option on the mobile terminal for setting a picture classification beforehand and providing an option for adding a classification label;

a classification selecting module for receiving, by using the option for setting the picture classification, an operational instruction from a user in a photographing interface for selecting a certain classification as a currently photographing classification;

a preserving controlling module for automatically appending, when a certain classification is selected as the currently photographing classification, corresponding picture information to a photographed picture after photographing the picture, and saving the photographed picture in a corresponding directory; and a browsing controlling module for providing a classification-based viewing option in browsing the pictures, and browsing the pictures or figures of a certain classification by using the classification-based viewing option.

12. The system according to claim 11, wherein the classification selecting module comprises:

a classification selecting unit for receiving the operational instruction from the user for selecting a certain classification as a currently photographing classification;

a new classification setting unit for adding and setting a new picture classification by using the option for adding the classification label;

an option providing unit for providing a menu option for selecting a one-time effect or a long-term effect in selecting the classification; and a receiving unit for setting, by using the option for setting the picture classification by receiving the operational instruction from the user, a topic, note information, and a desired directory to preserve the picture, of a present classification for each classification label.

13. The system according to claim 11, wherein the preserving controlling module comprises:

a photographing preserving controlling unit for automatically adding a corresponding topic and note information to a corresponding database for the photographed picture and automatically saving the picture in the corresponding directory specified in advance after photographing the picture; and a preserving path controlling unit for determining whether a value is assigned to a classification preserving path variable in preserving the picture after photographing is accomplished, and preserving the picture according to such a path if a value is assigned and preserving the picture using a system default path if no value is assigned; and writing note information to a database corresponding to the picture if a value is assigned to a classification note information preservation variable.

* * * * *